(12) United States Patent
Menendez Gonzalez et al.

(10) Patent No.: US 10,885,545 B1
(45) Date of Patent: Jan. 5, 2021

(54) IDENTIFYING PRODUCTS PURCHASED BY AN ONLINE SYSTEM USER VIA A THIRD-PARTY SYSTEM TO A CONTENT PUBLISHING USER OF THE ONLINE SYSTEM ASSOCIATED WITH THE PRODUCTS

(71) Applicant: Facebook, Inc., Menlo Park, CA (US)

(72) Inventors: Pablo Menendez Gonzalez, Mountain View, CA (US); Ryan Kanoknukulchai, San Francisco, CA (US); German Chiazzo Cardarello, Redwood City, CA (US); Priyanka Baheti, London (GB); Pramod Negi, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 190 days.

(21) Appl. No.: 16/111,159

(22) Filed: Aug. 23, 2018

(51) Int. Cl.
*G06Q 30/02* (2012.01)

(52) U.S. Cl.
CPC ..... *G06Q 30/0244* (2013.01); *G06Q 30/0246* (2013.01)

(58) Field of Classification Search
CPC ...................................................... G06Q 30/02
See application file for complete search history.

(56) References Cited

U.S. PATENT DOCUMENTS

| | | | | |
|---|---|---|---|---|
| 2010/0312710 | A1* | 12/2010 | Bullock | G06Q 30/08 705/80 |
| 2012/0041834 | A1* | 2/2012 | McRae, II | G06Q 30/08 705/26.3 |
| 2012/0246029 | A1* | 9/2012 | Ventrone | G06Q 30/06 705/26.63 |
| 2014/0365618 | A1* | 12/2014 | Doyle | H04L 67/06 709/219 |

OTHER PUBLICATIONS

Anonymous, Good Practice Guide on Online Advertising: Protecting Consumers in E-Commerce, OECD Digital Economy Papers 279. (Mar 28, 2019)., (Year: 2019).*

* cited by examiner

*Primary Examiner* — Marilyn G Macasiano
(74) *Attorney, Agent, or Firm* — Fenwick & West LLP (57) ABSTRACT

An online system receives information from a third-party system identifying products offered by the third-party system and content publishing users associated with each product. The online system identifies products associated with a specific content publishing user to the specific content publishing user and receives a content item from the specific publishing user including a link to the third-party system. After presenting the content item to a user, the online system receives information from a tracking mechanism included in content maintained by the third-party system if the user interacts with the third-party system after being presented with the content item. Based on information from the tracking mechanism identifying products associated with the specific content publishing user, the online system may modify subsequent presentation of content items associated with the specific content publishing user.

16 Claims, 3 Drawing Sheets

IDENTIFYING PRODUCTS PURCHASED BY AN ONLINE SYSTEM USER VIA A THIRD-PARTY SYSTEM TO A CONTENT PUBLISHING USER OF THE ONLINE SYSTEM ASSOCIATED WITH THE PRODUCTS

BACKGROUND

This disclosure relates generally to online systems, and more specifically to identifying interaction with a third-party system performed by online system users after presentation of content obtained from a content publishing user by the online system.

Online systems, such as social networking systems, allow online system users to connect to and to communicate with other online system users. Users may create profiles on an online system that are tied to their identities and include information about the users, such as interests and demographic information. The users may be individuals or entities such as corporations or charities. Online systems allow users to easily communicate with other users and to share content with other users by providing content items to an online system for presentation to the other users. Content items provided to an online system by a user may include declarative information about the user, status updates, check-ins to locations, images, photographs, videos, text, and/or any other information the user wishes to share with additional users of the online system. An online system may also generate content items for presentation to a user, such as content items describing actions taken by other users on the online system.

Content items presented to users of an online system are often associated with actions that may be performed by the users on third-party systems, such as websites, external to the online system. For example, an online system presents a user with a content item including a link to a webpage maintained by a third-party system on which the user may request information about a subject matter or topic of the content item, register to attend an event associated with the content item, purchase a product or service associated with the content item, or perform other suitable actions. Online system users presented with a content item including a link to a website maintained by a third-party system may navigate to website by selecting (e.g., clicking on, tapping on) the link included in the presented content item and perform one or more of the actions associated with the content item on the website maintained by the third-party system.

An online system presenting content items associated with actions that may be performed on third-party system may receive content for presentation from content publishing users who are associated with products provided by a third-party system. While third-party systems presenting content to users who access links in various content items presented by the online system may embed a tracking mechanism associated with the online system in content presented by the third-party system to provide information describing actions by users with the content presented by the third-party system, this information is generally not accessible to content publishing users who are not affiliated with the third-party system providing the content. For example, a content publishing user provides content items identifying products offered by the content publishing user to the online system that include a link to a third-party system other than the content publishing user selling the identified products. When a user of the online system accesses the link included a content item provided by the content publishing user, the user is presented with content provided by the third-party system. In the preceding example, information from the third-party system describing interactions by online system users with content presented by the third-party system is provided to the online system, but is inaccessible to the content publishing user. For example, the content publishing user provides the online system with content items identifying products provided by the content publishing user and links to third-party systems offering the products for sale. The third-party systems include tracking pixels in order confirmation pages on which a purchase associated with the content items may be made. If a purchase associated with the order confirmation page of the previous example is performed, the order confirmation page is presented and the online system receives information from the tracking mechanism included in the order confirmation page. Based on various types of information that may obtained via the tracking mechanism, the online system determines that a purchase associated with a content item received from the content publishing user has been performed via a third-party system.

Depending on information obtained from a tracking mechanism included in content provided by a third-party system, the online system may determine various attributes associated with performance of an action with content provided by the third-party system. For example, based on the received information, an online system may determine a type of action performed, a time of the performance of the action, an identity of an online system user who performed the action, and an identity of the website on which the action was performed. Information received by an online system describing actions associated with content items performed on third party websites may be utilized by the online system for various purposes. For example, an online system may utilize the received information to generate various performance metrics describing a content item's effectiveness for eliciting a particular action on a particular website. The online system of the previous example may utilize one or more of the performance metrics to optimize selection and presentation of the content item to users of the online system (e.g., to maximize a number of actions elicited) and provide the metric to an entity associated with the content item to encourage the entity to provide the online system with additional content items for presentation by the online system. A content publishing user associated with content items described by such information may also rely on the information to subsequently tailor content items to be more effective in eliciting the associated actions. Therefore, the receipt of accurate and complete information describing actions associated with content items presented by the online system and performed on third party websites is important.

However, third-party systems may be reluctant to authorize an online system to provide metrics based on actions performed by users on content presented by the third-party systems with content publishing users who are not affiliated with the third-party systems. This prevents content publishing users from better tailoring content items for presentation to online system users and may discourage content publishing users from subsequently providing content items to the online system for presentation to users. Further, even if the online system receives information from a third-party system informing the online system that a particular action has been performed with content provided by the third-party system, the online system may be unable to link the performance of the action with presentation of the content item due to the disconnection between the content publishing user who provided the content item to the online system and the third-party system on which the action was performed. This may diminish an online system's ability to optimize presentation of content items to online system users and to further encourage content publishing users to provide the online system with content items for presentation.

SUMMARY

An online system receives a content item from a content publishing user of the online system for presentation to viewing users of the online system. The content item is associated with one or more actions that may be performed by a viewing user via a set including one or more third-party systems that are not associated with the content publishing user. As the set of third-party systems is not associated with the content publishing user from whom the content item is received, information describing actions associated with content presented by a third-party system when the viewing user accesses a link included in the content item may not be directly available to the content publishing user or to the online system. Although a third-party system may provide the online system with some information describing performances of various actions with content presented by the third-party system, this information is often inaccessible to the content publishing user, because the content publishing user is not associated with the third-party system. Additionally, information provided to the online system from a third-party system via a tracking mechanism (e.g., a tracking pixel included in content presented by the third-party system) may allow the online system to identify an action that occurred on the third-party system, but does not provide information to a content publishing user other than the third-party system or the online system to evaluate presentation of content provided to the online system from the content publishing user.

To allow entities other than the third-party system referred to herein as "content publishing users" to leverage certain interactions by users of the online system with content presented by the third-party system, which offers products associated with a content publishing user other than the third-party system, the online system obtains information from the third-party system describing characteristics of products offered by the third-party system. The information obtained by the online system includes a product identifier for each of at least a set of products offered by the third-party system, an identifier of a content publishing user associated with each of at least the set of products, and information describing each of the set of products. For example, the online system obtains a catalog of products offered by the third-party system, where the catalog includes an entry for reach product offered by the third-party system. In the preceding example, an entry in the catalog includes information describing a product, a product identifier, and an identifier of a content publishing user associated with the product. Example information describing a product includes a price charged for the product by the third-party system, a name of the product, details about the product, or any other suitable information. The online system may obtain information describing products from multiple third-party systems and store the obtained information in association with an identifier with each third-party system, allowing the online system to maintain information describing products offered by different third-party systems. In some embodiments, the online system periodically obtains information describing products from a third-party system, allowing information describing products offered by the third-party system to be updated. Alternatively, the third-party system provides updated information describing products offered by the third-party system to the online system when the third-party system changes information about one or more products or changes a product offered by the third-party system.

A specific content publishing user transmits a request to the online system including the identifier of the specific content publishing user. In various embodiments, the request includes an identifier of the third-party system. When the online system receives the request, the online system retrieves information describing characteristics of products provided by the third-party system and selects products provided by the third-party system associated with the identifier of the specific content publishing user. For example, the specific content publishing user is a manufacturer, so the online system selects products provided by the third-party system associated with an identifier of the manufacturer. The online system transmits information identifying the selected products to the specific content publishing user, without transmitting information identifying products offered by the third-party system associated with identifiers of other content publishing users. Hence, the specific content publishing user receives information identifying products of the specific content publishing user offered by the third-party system, but does not receive information about products of other entities (e.g., content publishing users) offered by the third-party system.

Based on the received information identifying products of the specific content publishing user offered by the third-party system, the specific content publishing user generates one or more content items for presentation via the online system. In various embodiments, a content item generated by the specific content publishing user includes a link to the third-party system as well as information describing one or more products selected by the specific content publishing user. A content item including a link to the third-party system includes information describing at least one product selected by the specific content publishing user and offered by the third-party system and a product identifier of the selected product; for example, the content item includes an image and a description of a selected product offered by the third-party system along with the link to the third-party system, as well as the product identifier of the selected product. In various embodiments, the product identifier of the selected product is obtained by the specific content publishing user from the information identifying products of the specific content publishing user offered by the third-party system received from the online system. Alternatively, the product identifier is specified by the specific content publishing user and the online system subsequently retrieves information mapping product identifiers used by the specific content publishing user to alternative product identifiers used by the third-party system.

The specific content publishing user transmits a generated content item to the online system. The content item transmitted to the online system includes information identifying a product associated with the specific content publishing user and offered by the online system, the product identifier of the product, and a link to the third-party system. When the online system subsequently identifies an opportunity to present content to a viewing user, the online system includes the content item from the specific content publishing user in one or more selection processes. In response to the one or more selection processes selecting the content item from the specific content publishing user, the online system presents the content item from the specific content publishing user to the viewing user. For example, the online system transmits the content item from the specific content publishing user to a client device that presents the content item to the viewing user.

When the client device receives a selection by the viewing user of the link to the third-party system included in the content item, the client device obtains and presents content from the third-party system. For example, the link identifies a landing page of content maintained by the third-party system, and the client device requests the landing page of content from the third-party system in response to the viewing user selecting (e.g., clicking on, tapping on) the link to the third-party system included in the content item. The client device subsequently receives and presents the landing page of content from the third-party system in response to the request.

At least a set of content from the third-party system presented by the client device includes a tracking mechanism comprising instructions that, when executed by the client device presenting the content, obtain information identifying one or more products included in the content and information identifying the user to the online system. When the client device executes the instructions comprising the tracking mechanism, the client device transmits the information identifying the one or more products included in the content and identifying the user to the online system. In various embodiments, executing the instructions comprising the tracking mechanism causes the client device to transmit additional information to the online system describing interaction with the content by the user of the online system. For example, executing the tracking mechanism causes the client device to transmit product identifiers of products included in the content including the tracking mechanism, prices of each product included in the content including the tracking mechanism, and a total cost of products included in the content including the tracking mechanism. Additionally, executing the tracking mechanism causes the client device to also transmit prices and quantities of products associated with the specific content publishing user, or any other information suitable for the online system to determine a cumulative price of products associated with the specific content publishing user included in the content including the tracking mechanism to the online system. For example, the third-party system includes the tracking mechanism in an order conformation page that is presented to the viewing user after the viewing user selects products offered by the third-party system for purchase.

Using information received from the tracking mechanism executed by the client device, the online system subsequently modifies one or more selection processes to increase likelihoods of content items received by the online system from the specific content publishing user. Because the online system received the content item from the specific content publishing user, the specific content publishing user provides the online system with compensation for presentation of the content item to the viewing user, even though the viewing user interacts with content presented by the third-party system. Accordingly, modifying a selection process based on information from the tracking mechanism describing a value to the specific content publishing user, rather than based on the interactions with the third-party system, allows the online system to better select content items for presentation to increase value to the specific content publishing user, which also increases revenue to the online system from the specific content publishing user. In one embodiment, the online system extracts or determine a total value of products identified by the tracking mechanism that are associated with the specific content publishing user and modifies a selection process based on the determined total value of products associated with the specific content publishing user and identified by the tracking mechanism. The tracking mechanism may transmit product identifiers of each product included in the content including the tracking mechanism, identifiers of content publishing users associated each product included in the content including the tracking mechanism, and values corresponding to each product identifier of a product included in the content including the tracking mechanism. The online system may determine the total value of products associated with the identifier of the specific content publishing user by summing the values corresponding to the products associated with the identifier of the specific content publishing user. Alternatively, the tracking mechanism sums values corresponding to the products associated with the identifier of the specific content publishing user and a cumulative total of values corresponding to products included in the content including the tracking mechanism. In some embodiments, the online system determines a ratio of a total of values corresponding to the products associated with the identifier of the specific content publishing user to the cumulative total of values corresponding to products included in the content including the tracking mechanism and modifies one or more selection processes based on the determined ratio. Hence, the online system modifies one or more selection processes to increase likelihoods of subsequent presentation of content items from the specific content publishing user to the viewing user (or to other users) that increase a value of products associated with the specific content publishing user 300 included in content presented by one or more third-party systems that include a tracking mechanism. In other embodiments, the online system uses any suitable value based on a cumulative price of products associated with the specific content publishing user identified by the tracking mechanism to modify one or more selection processes. This allows the online system to leverage information received from tracking mechanisms third-party systems include on content to optimize subsequent presentation of content received from the specific content publishing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
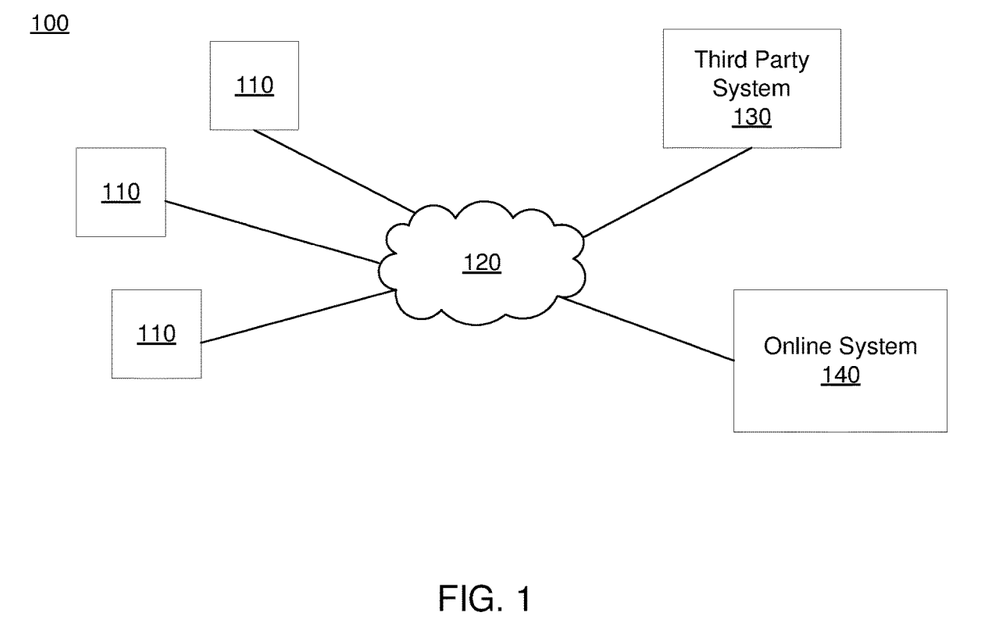
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems that are content sharing networks or other online systems 140 providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. A third-party system 130 may also communicate information to the online system 140, such as advertisements, content, or information about an application provided by the third-party system 130.

In some embodiments, one or more of the third-party systems 130 provide content to the online system 140 for presentation to users of the online system 140 and provide compensation to the online system 140 in exchange for presenting the content. For example, a third-party system 130 provides advertisement requests, which are further described below in conjunction with FIG. 2, including advertisements for presentation and amounts of compensation provided by the third-party system 130 for presenting the advertisements to the online system 140. Other types of sponsored content may be provided by a third-party system 130 to the online system 140 for presentation by the online system 140 in exchange for compensation from the third-party system 130. Sponsored content from a third-party system 130 may be associated with the third-party system 130 or with an entity on whose behalf the third-party system 130 operates.

Figure 2:
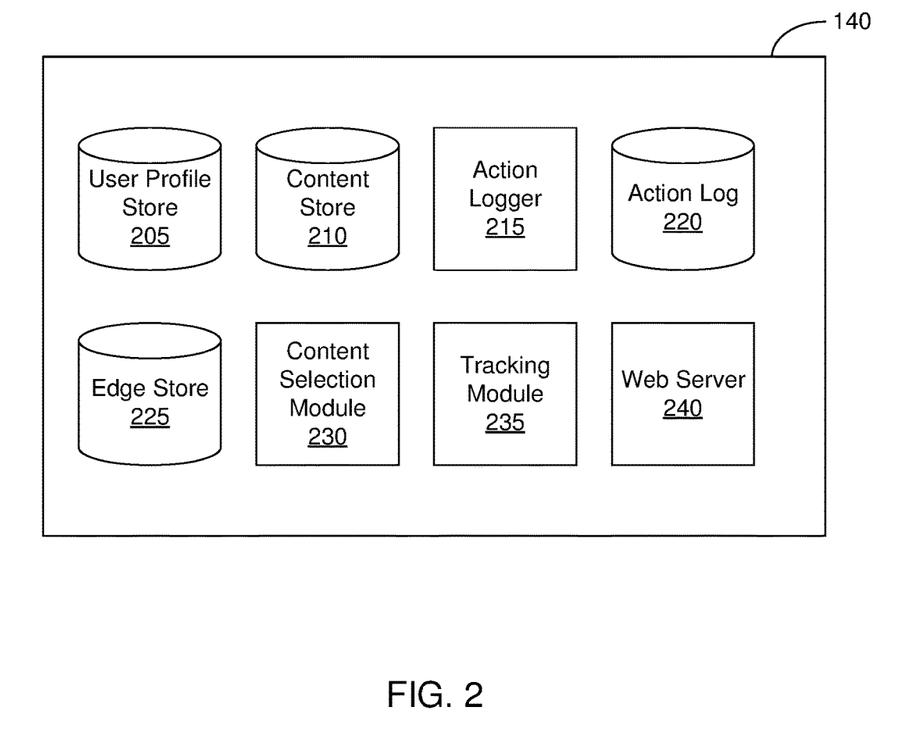
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a tracking module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a content publishing user who provided the content item to the online system 140 and is used to determine an expected value, such as monetary compensation, provided by the content publishing user to the online system 140 if content in the content item is presented to an additional user, if the content in the content item receives a user interaction when presented, or if any suitable condition is satisfied when content in the content item is presented to an additional user. For example, the bid amount included in a content item specifies a monetary amount that the online system 140 receives from a content publishing user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a content publishing user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the content publishing user who provided the content item to the online system 140. Targeting criteria included in a content item request specify one or more characteristics of users eligible to be presented with the content item. For example, targeting criteria are used to identify users having user profile information, connections, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third-party system 130. For example, targeting criteria identifies users that have taken a particular action, such as sent a message to another user, used an application, joined a group, left a group, joined an event, generated an event description, purchased or reviewed a product or service using an online marketplace, requested information from a third-party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In various embodiments, the action logger 215 receives action data comprising information describing user actions external to the online system 140 and stores the action data in the action log 220 along with references to users who performed the actions. In certain embodiments, action data received and logged by the action logger 215 comprises information describing various types of user actions performed on third party websites allowing the online system 140 to identify websites on which specified actions associated with content items may be and/or have been performed. For example, the action logger 215 receives action data from a client device 110 used to access a third party website on which a user action is performed. Action data describing a user action performed on a third party website received by the action logger 215 comprises information describing an identity of the website (e.g., a URL of a webpage of the website), a description of the action performed on the website (e.g., an action type identifier associated with the action), a time at which the action was performed, and a description of one or more topics and/or subtopics associated with the performed action (e.g., story identifiers, event identifiers, product identifiers, etc.). The one or more topics and/or subtopics associated with the performed action may be associated with content items presented by the online system 140. For example, a set of topics and subtopics described by action data received by the action logger 215 may describe a user-generated story associated with a content item maintained in the content store 210, an event associated with the content item, a product or service associated with the content item, etc. The action logger 215 stores the received action data in the action log 220.

In certain embodiments, action data is received by the action logger 215 via a tracking mechanism associated with the online system 140 embedded by a content publisher in one or more pages of a website published by the content publisher. For example, the tracking mechanism comprises instructions included in a webpage of a third party website by a publisher of the website that cause a client device 110 or application executing on the client device 110 presenting the webpage to send action data to the online system 140 when a user action is performed on the webpage (e.g., via a plug-in associated with the online system 140). In some embodiments, action data received by the action logger 215 is included in a request for a tracking pixel received from a client device 110 used to access a third party web site on which a user action is performed. For example, the tracking pixel is embedded in a website on which a user action is performed and is associated with various parameters that each track information included in a page of the website associated with the action, such as an action type parameter, an action topic parameter, and one or more action subtopic parameters embedded in an order confirmation page of the website. When the page is being generated for presentation (e.g., in response to a user action performed on the website), a request for the tracking pixel is communicated to the online system 140 along with the action data comprising information describing the parameters associated with the tracking pixel, which track information about the performance of the action included in the page. The action logger 215 receives and parses the request for the tracking pixel to extract information comprising the action data and stores the extracted action data in the action log 220.

In other embodiments, the action logger 215 extracts action data from information stored at a client device 110 (e.g., in a cookie) used to access a third party web site on which a user action is performed. For example, a web browser used to access a third party website on which a user action is performed stores action data describing various details about performances of user actions in a cookie at a client device 110 on which the browser is executing in response to instructions included in the website by a publisher of the website. The action data stored at the client device 110 comprises information including at least a description of the third party website on which the user action was performed, a description of the performed action, a time at which the action was performed, and a description of one or more topics and/or subtopics associated with the performed action. The action data is communicated to the online system 140 when an individual using the client device 110 on which it is stored logs in to the online system 140 via the client device 110 or at various pre-determined time intervals. The action logger 215 extracts the action data from the stored information (e.g., from a cookie) and stores the action data in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 by the application for recordation and association with the user in the action log 220.

In certain embodiments, information stored in the action log 220 describing user actions taken on a third-party system 130 comprises action data received by the action logger 215. As described above, action data received by the action logger 215 and stored in the action log 220 is information provided by a content publisher associated with a third party website describing various types of user actions performed on the third party website. In various embodiments, information comprising action data provided by a content publisher includes an amount of detail that is sufficient to allow the online system 140 to identify a website on which a user action may be and/or has been performed and to associate the user action with a content item presented by the online system 140. For example, action data received from a client device 110 used to access a third party website on which a user action is performed includes information describing at least an identity of the website (e.g., a URL of a webpage of the website), a description of the user action performed on the website (e.g., an action type identifier associated with the action), a time at which the action was performed, and a description of one or more topics and/or subtopics associated with the performed action (e.g., a story identifier, an event identifier, a product identifier, a service identifier, etc.). In various embodiments, action data may be stored in the action log 220 along with references to users identified by the user identification module 240 as individuals who performed the actions.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having a highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content (also referred to as a "content feed") to a user of the online system 140. The feed may include one or more content items associated with bid amounts (i.e., "sponsored content items") as well as organic content items, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

As further described below in conjunction with FIGS. 3 and 4, the content selection module 230 may modify one or more selection processes selecting content for presentation to a user based on information received by the online system 140 from tracking mechanisms included in content provided by third-party systems 130 and presented by client devices 110. In various embodiments, information received from a tracking mechanism identifies products associated with a specific content publishing user different from a third-party system 130 including the tracking mechanism in content and who provided content items to the online system 140 for presentation. Based on the information received from the tracking mechanism, the content selection module 230 may modify one or more selection processes to increase likelihoods of users being presented with other content items received from the specific content publishing users. This allows the content selection module 230 to leverage information received from third-party systems 130 to affect presentation of content items received from entities other than the third-party systems 130.

In various embodiments, the content selection module 230 presents content to a user through a feed including a plurality of content items selected for presentation to the user. One or more content items associated with bid amounts may be included in the feed. The content selection module 230 may also determine an order in which selected content items are presented via the feed. For example, the content selection module 230 orders content items in the feed based on likelihoods of the user interacting with various content items.

The tracking module 235 generates tracking mechanisms used by the online system 140 to track presentations of content to individuals by third-party systems 130 and user actions performed on websites presented by the third-party system 130. Examples of tracking mechanisms include tracking pixels embedded in content presented by third-party systems 130 to users and cookies stored at client devices 110 used by users to access content form the third-party systems 130. In various embodiments, tracking mechanisms generated by the tracking module 235 communicate action data to the online system 140 describing presentations of content by a third-party system 130 and actions performed on websites presenting the content when executed by a client device 110 presenting content including a tracking mechanism. For example, the tracking module 235 generates code comprising a tracking pixel embedded by a third-party system 130 a webpage of the third-party system 130 associated with an action that may be performed by a user via the webpage. The tracking pixel is associated with a set of action event parameters (e.g., an action type parameter, an action topic parameter, an action subtopic parameter, etc.) that track information associated with a performance of the action included in the page. When the webpage is generated for presentation (e.g., in response to a performance of the action on the website), the tracking pixel communicates action data comprising information describing the set of action parameters associated with the tracking pixel to the online system 140. Based on the information tracked by the set of action parameters associated with the tracking pixel, the online system 140 determines various types of information about the performance of the action on the website (e.g., a type of action performed, a description of an item purchased, etc.).

The web server 240 links the online system 140 via the network 120 to the one or more client devices 110, as well as to the one or more third-party systems 130. The web server 240 serves web pages, as well as other content, such as JAVA®, FLASH®, XML and so forth. The web server 240 may receive and route messages between the online system 140 and the client device 110; for example, the messages are instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

In various embodiments, the web server 240 receives information describing actions performed by individuals including online system users on the online system 140 and on various third-party systems 130. For example, the web server 240 receives the information via one or more tracking mechanisms associated with the online system 140 or third-party systems 130 on which the actions are performed by the individuals. In some embodiments, the web server 240 receives action data describing actions performed by users on third-party systems 130 from tracking pixels included in content from the third-party systems 130 including tracking pixels. In other embodiments, the web server 240 receives action data describing actions performed by individuals via third-party systems 130 via cookies including the action data stored at client devices 110 used to access the third-party systems 130. Upon receiving action data describing actions performed by individuals on third-party systems 130, the web server 240 communicates the action data to the action logger 215, which stores the information in the action log 220 for later retrieval and analysis, in some embodiments.

Figure 3:
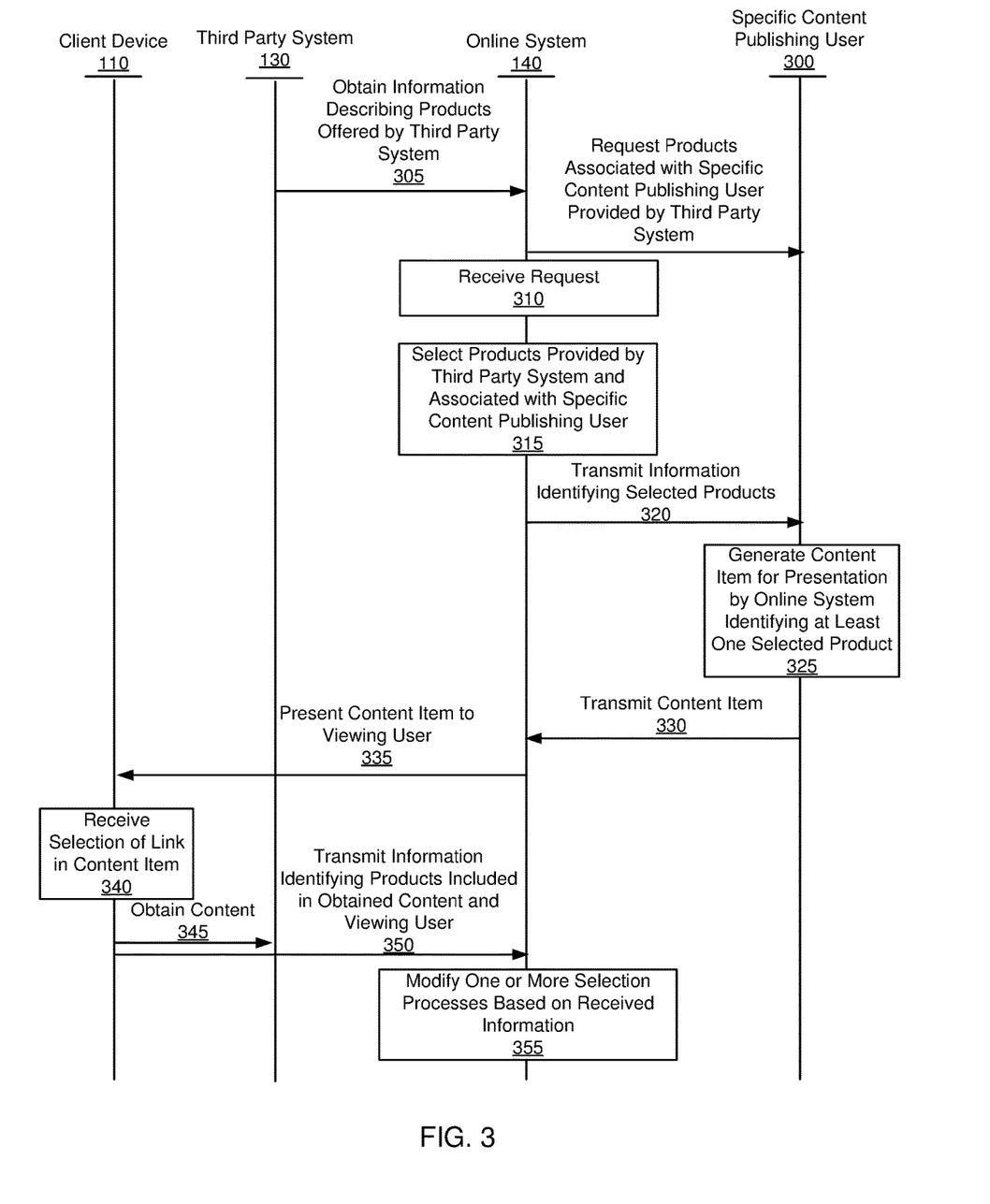
FIG. 3 is an interaction of a method for an online system identifying one or more products purchased by a viewing user via a third-party system to a content publishing user who is not associated with the third-party system, in accordance with an embodiment.

Identifying Products Purchased by Online System Users Via Third-Party Systems to a Content Publishing User of the Online System FIG. 3 is an interaction diagram of one embodiment of a method for an online system 140 identifying one or more products purchased by a viewing user via a third-party system 130 to a content publishing user who is not associated with the third-party system 130. In other embodiments, the method may include different and/or additional steps than those shown in FIG. 3. Additionally, steps of the method may be performed in different orders than the order described in conjunction with FIG. 3 in various embodiments.

A third-party system 130 allows users to purchase products (e.g., goods or services) via interaction with the third-party system 130. For example, the third-party system 130 is an online retailer offering various products for sale, allowing a user to select products and to provide the third-party system 130 with compensation in exchange for providing the selected products to the user. In various embodiments, products offered by the third-party system 130 are associated with entities other than the third-party system 130. For example, the third-party system 130 offers products associated with manufacturers other than the third-party system (e.g., clothing provided to the third-party system 130 from a manufacturer or a brand). A third-party system 130 may offer products associated with multiple entities, allowing users to more readily obtain products associated with different entities from various third-party systems 130.

Entities associated with products offered by third-party systems 130 often provide content items to an online system 140 for presentation to users by the online system 140. The content items include information about products associated with the third party systems 130 and associated with the entities. For example, a product manufacturer provides the online system 140 with content items describing products manufactured by the product manufacturer and including a link to a third party system 130 that is different from the product manufacturer but offers the described products manufactured by the product manufacturer for purchase. This allows an entity associated with products offered by third-party systems 130 to increase awareness of products associated with the entity, potentially increasing revenue to the entity associated with the products. To allow users to more easily obtain products associated with an entity, content items provided to the online system 140 by the entity may include a link to a third-party system 130 offering one or more products associated with the entity. Accordingly, when a user accesses (e.g., clicks on, taps on) the link included in the content item via a client device 110, the client device 110 presents content from the third-party system 130, allowing the user to interact with the third-party system 130 and to purchase one or more of the products associated with the entity.

While a third-party system 130 may include a tracking mechanism in content presented to users that provides information to the online system 140 describing content presented to the users by the third-party system, or interactions by users with content presented by the third-party system 130, the information obtained by the online system 140 from the tracking mechanism is often inaccessible to entities other than the third-party system 130. For example, a third-party system 130 includes a tracking mechanism in an order confirmation page comprising instructions that, when executed by a client device 110 presenting the order confirmation page, obtain information identifying one or more products identified in the order confirmation page and a total amount of an order of products described by the order confirmation page and information identifying a user for whom the order confirmation page was generated to the online system 140; execution of the instructions comprising the tracking mechanism further causes the client device 110 to communicate the information identifying the one or more products, the total amount of the order, and identifying the user to the online system 140. The online system 140 may subsequently use this information when selecting content items received from the third-party system 130 to users. However, the information from the tracking mechanism included in content presented to users by the third-party system 130 is not accessible to entities who provided content items including links to the third-party system 130 to the online system 140 for presentation and who are different than third party system 130. This may decrease effectiveness of presentation of other content items from the entities other than the third-party system 130 (e.g., from manufacturers of products offered for sale by the third-party system 130).

To allow entities other than the third-party system 130, referred to herein as "content publishing users" to leverage certain interactions by users of the online system 140 with content presented by the third-party system 130, which offers products associated with a content publishing user other than the third-party system 130, the online system 140 obtains 305 information from the third-party system 130 describing characteristics of products offered by the third-party system 130. The information obtained 305 by the online system 140 includes a product identifier for each of at least a set of products offered by the third-party system 130, an identifier of a content publishing user associated with each of at least the set of products, and information describing each of the set of products. For example, the online system 140 obtains a catalog of products offered by the third-party system 130, where the catalog includes an entry for reach product offered by the third-party system 130. In the preceding example, an entry in the catalog includes information describing a product, a product identifier, and an identifier of a content publishing user associated with the product. Example information describing a product includes a price charged for the product by the third-party system 130, a name of the product, details about the product, or any other suitable information. The online system 140 may obtain 305 information describing products from multiple third-party systems 130 and store the obtained information in association with an identifier with each third-party system 130, allowing the online system 140 to maintain information describing products offered by different third-party systems 130. In some embodiments, the online system 140 periodically obtains 305 information describing products from a third-party system 130, allowing information describing products offered by the third-party system 130 to be updated. Alternatively, the third-party system 130 provides updated information describing products offered by the third-party system 130 to the online system 140 when the third-party system 130 changes information about one or more products or changes a product offered by the third-party system 130.

A specific content publishing user 300 transmits a request to the online system 140 including the identifier of the specific content publishing user 300. In various embodiments, the request includes an identifier of the third-party system 130. When the online system 140 receives 310 the request, the online system 140 retrieves information describing characteristics of products provided by the third-party system 130 and selects 315 products provided by the third-party system 130 associated with the identifier of the specific content publishing user 300. For example, the specific content publishing user 300 is a manufacturer, so the online system 140 selects 315 products provided by the third-party system 130 associated with an identifier of the manufacturer. The online system 140 transmits 320 information identifying the selected products to the specific content publishing user 300, without transmitting information identifying products offered by the third-party system 130 associated with identifiers of other content publishing users. In other embodiments, the online system 140 transmits 320 information identifying products provided by the third-party system 130 associated with the identifier of the specific content publishing user 300 to the specific content publishing user 300 after obtaining 305 the information from the third party system 130 without receiving 310 the request from the specific content publishing user 300. Alternatively, the third party system 130 transmits information describing products offered by the third-party system 130 and associated with the specific content publishing user 300 directly to the specific content publishing user 300 without transmitting information identifying products offered by the third party system 130 that are not associated with the specific content publishing user 300. Hence, the specific content publishing user 300 receives information identifying products of the specific content publishing user 300 offered by the third-party system 130, but does not receive information about products of other entities (e.g., content publishing users) offered by the third-party system 130.

Based on the received information identifying products of the specific content publishing user 300 offered by the third-party system 130, the specific content publishing user 300 generates 325 one or more content items for presentation via the online system 140. For example, the specific content publishing user 300 provides information to the online system 140 that use used by the online system 140 to generate the one or more content items. In various embodiments, a content item generated by the specific content publishing user 300 includes a link to the third-party system 130 as well as information describing one or more products selected by the specific content publishing user 300. A content item including a link to the third-party system 130 includes information describing at least one product selected by the specific content publishing user 300 and offered by the third-party system 130 and a product identifier of the selected product; for example, the content item includes an image and a description of a selected product offered by the third-party system 130 along with the link to the third-party system 130, as well as the product identifier of the selected product. In various embodiments, the product identifier of the selected product is obtained by the specific content publishing user 300 from the information identifying products of the specific content publishing user 300 offered by the third-party system 130 received from the online system 140. Alternatively, the product identifier is specified by the specific content publishing user and the online system 140 subsequently retrieves information mapping product identifiers used by the specific content publishing user 300 to alternative product identifiers used by the third-party system 130. A content item generated 325 by the specific content publishing user 300 includes a bid amount specifying an amount of compensation the online system 140 receives from the content publishing user 300 in exchange for presenting the content item to a user or for a user performing one or more actions after being presented with the content item, as further described above in conjunction with FIG. 2.

The specific content publishing user 300 transmits 330 a generated content item to the online system 140. The content item transmitted 330 to the online system 140 includes information identifying a product associated with the specific content publishing user 300 and offered by the online system 140, the product identifier of the product, and a link to the third-party system 130. In some embodiments, the content item transmitted by the specific content publishing user 300 includes a set of candidate products associated with the specific content publishing user 300 and offered by the third-party system 130. The online system 140 selects one or more of the candidate products based on stored information associated with a viewing user to whom the content item is to be presented by the online system 140 identifying products previously accessed by the viewing user and characteristics of the candidate products associated with the specific content publishing user 300. For example, the online system 140 selects a candidate product having at least a threshold amount of characteristic matching products previously accessed by the viewing user. In another embodiment, the content item includes an identifier of the specific content publishing user 300, an identifier of the third-party system 130, and the link to the third-party system 130. The online system 140 identifies products associated with the specific content publishing user 300 and offered by the third-party system 130 from the information from the third-party system 130 describing characteristics of products offered by the third-party system 130. Subsequently, the online system 140 selects one or more of the identified products based on stored information associated with a viewing user to whom the content item is to be presented by the online system 140 identifying products previously accessed by the viewing user and characteristics of the identified products associated with the third-party system 130. For example, the online system 140 selects an identified product having at least a threshold amount of characteristics matching products previously accessed by the viewing user. Selection of products associated with a content publishing user for inclusion in a content item is further described in U.S. patent application Ser. No. 15/600,640, filed on May 19, 2017, which is incorporated by reference herein in its entirety.

When the online system 140 subsequently identifies an opportunity to present content to a viewing user, the online system 140 includes the content item from the specific content publishing user 300 in one or more selection processes, further described above in conjunction with FIG. 2. In response to the one or more selection processes selecting the content item from the specific content publishing user 300, the online system 140 presents 335 the content item from the specific content publishing user 300 to the viewing user. For example, the online system 140 transmits the content item from the specific content publishing user 300 to a client device 110 that presents the content item to the viewing user.

When the client device 110 receives 335 a selection by the viewing user of the link to the third-party system 130 included in the content item, the client device 110 obtains content from the third-party system 130 and presents the content from the third-party system 130. For example, the link identifies a landing page of content maintained by the third-party system 130, and the client device 110 requests the landing page of content form the third-party system 130 in response to the viewing user selecting (e.g., clicking on, tapping on) the link to the third-party system 130 included in the content item. The client device 110 subsequently receives and presents the landing page of content from the third-party system 130 in response to the request.

At least a set of content from the third-party system 130 presented by the client device 110 includes a tracking mechanism comprising instructions that, when executed by the client device 110 presenting the content, obtain information identifying one or more products included in the content and information identifying the user to the online system 140. In some embodiments, the content from the third party system 130 including the tracking mechanism is presented by an alternative client device 110, which is different form the client device 110 that presented 335 the content item from the specific publishing user 300. When the client device 110 executes the instructions comprising the tracking mechanism, the client device 110 transmits 340 the information identifying the one or more products included in the content and identifying the user to the online system 140. In various embodiments, executing the instructions comprising the tracking mechanism causes the client device 110 to transmit 340 additional information to the online system 140 describing interaction with the content by the user of the online system 140. For example, executing the tracking mechanism causes the client device 110 to transmit 340 product identifiers of products included in the content including the tracking mechanism, prices of each product included in the content including the tracking mechanism, and a total cost of products included in the content including the tracking mechanism. Additionally, executing the tracking mechanism causes the client device 110 to also transmit 340 prices and quantities of products associated with the specific content publishing user 300 or any other information suitable for the online system 140 to determine a cumulative price of products associated with the specific content publishing user 300 included in the content including the tracking mechanism to the online system 140. For example, the third-party system 130 includes the tracking mechanism in an order conformation page that is presented to the viewing user after the viewing user selects products offered by the third-party system 130 for purchase.

Using information received from the tracking mechanism executed by the client device 110, the online system 140 subsequently modifies 345 one or more selection processes to increase likelihoods of content items received by the online system 140 from the specific content publishing user 300. Because the online system 140 received the content item from the specific content publishing user 300, the specific content publishing user 300 provides the online system 140 with compensation for presentation of the content item to the viewing user, even though the viewing user interacts with content presented by the third-party system 130. Accordingly, modifying 345 a selection process based on information from the tracking mechanism describing a value to the specific content publishing user 300, rather than based on the interactions with the third-party system 130, allows the online system 140 to better select content items for presentation to increase value to the specific content publishing user 300, which also increases revenue to the online system 140 from the specific content publishing user 300. In one embodiment, the online system 140 extracts or determine a total value of products identified by the tracking mechanism that are associated with the specific content publishing user 300 and modifies a selection process based on the determined total value of products associated with the specific content publishing user 300 and identified by the tracking mechanism. The tracking mechanism may transmit 340 product identifiers of each product included in the content including the tracking mechanism, identifiers of content publishing users associated each product included in the content including the tracking mechanism, and values corresponding to each product identifier of a product included in the content including the tracking mechanism. The online system 140 may determine the total value of products associated with the identifier of the specific content publishing user 300 by summing the values corresponding to the products associated with the identifier of the specific content publishing user 300. Alternatively, the tracking mechanism sums values corresponding to the products associated with the identifier of the specific content publishing user 300 and a cumulative total of values corresponding to products included in the content including the tracking mechanism. In some embodiments, the online system 140 determines a ratio of a total of values corresponding to the products associated with the identifier of the specific content publishing user 300 to the cumulative total of values corresponding to products included in the content including the tracking mechanism and modifies one or more selection processes based on the determined ratio. Hence, the online system 140 modifies one or more selection processes to increase likelihoods of subsequent presentation of content items from the specific content publishing user 300 to the viewing user (or to other users) that increase a value of products associated with the specific content publishing user 300 included in content presented by one or more third-party systems 130 that include a tracking mechanism. In other embodiments, the online system 140 uses any suitable value based on a cumulative price of products associated with the specific content publishing user 300 determined from prices and quantities of products associated with the specific content publishing user 300 identified by the tracking mechanism to modify one or more selection processes. This allows the online system 140 to leverage information received from tracking mechanisms third-party systems 130 include on content to optimize subsequent presentation of content received from the specific content publishing user 300. Additionally, the online system 140 requests compensation from the specific content publishing user 300 in response to information from the tracking mechanism identifying one or more products associated with the specific content publishing user 300.

In various embodiments, using information received from the tracking mechanism executed by the client device 110, the online system 140 generates one or more metrics describing presentation of content items received by the online system 140 from the specific content publishing user 300 that include a link to the third party system 130. For example, a metric identifies a number of purchases of products via the third party system 130 that included at least one product associated with the specific content publishing user 130 after presentation by the online system 140 of a content item received from the specific content publishing user 300 that included a link to the third party system 130. As another example, a metric identifies a number of unique users of the online system 140 who purchased a product associated with the specific content publishing user 300 via the third party system 130 after being presented with a content item received from the specific content publishing user 300 that included a link to the third party system 130 by the online system 140. In another example, metric identifies a total monetary amount of purchases of products via the third party system 130 that included at least one product associated with the specific content publishing user 130 after presentation by the online system 140 of a content item received from the specific content publishing user 300 that included a link to the third party system 130. However, any suitable metric may be generated by the online system 140 in various embodiments. The online system 140 transmits the one or more metrics to the specific content publishing user 300 in various embodiments, allowing the specific content publishing user 300 to evaluate effectiveness of content items transmitted 330 to the online system 140 by the content publishing user 300 in inciting actions with the third party system 130 to whom the online system 140 presented the content items. Additionally, the online system 140 may provide information to the third party system 130 identifying interactions with the third party system 130 caused by presentation of content items from the specific content publishing user 300 received by the online system 140 from the specific content publishing user 300 and including a link to the third party system 130. For example, the online system 140 identifies a total number of purchases identified by tracking mechanisms included in content presented to users by the third party system 130 that included tracking mechanisms and from which the online system 140 received information from the tracking mechanisms identifying purchases of products within a specific time interval after the online system 140 presented 335 the content item from the specific content publishing user 300 to the users via a client device 110. As another example, the online system 140 identifies a total amount of purchases of products associated with the specific content publishing user 300 made via the third party system 130 by users to whom the online system 140 presented 335 the content item from the specific content publishing user 300 based on information received from tracking mechanisms included in content from the third party system 130. However, in other embodiments, the online system 140 provides any suitable information to the third party system 130 describing interactions by users to whom the content item from the specific content publishing user 300 was presented with the third party system 130.

Figure 4:
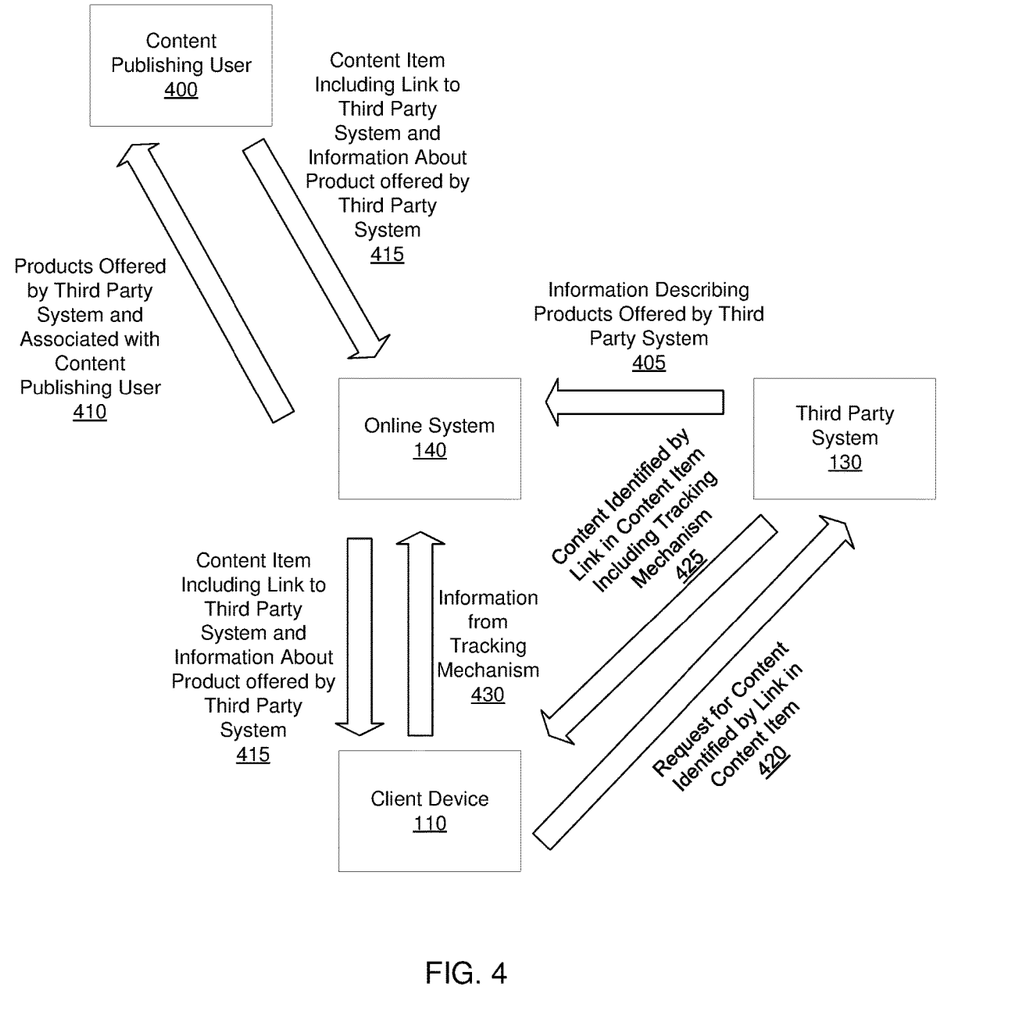
FIG. 4 is an interaction diagram of a method for an online system identifying one or more products purchased by a viewing user via a third-party system to a content publishing user who is not associated with the third-party system, in accordance with an embodiment.

FIG. 4 is a process flow diagram of one embodiment of a method for an online system 140 identifying one or more products purchased by a viewing user via a third-party system 130 to a content publishing user who is not associated with the third-party system 130. A third-party system 130 offers or provides products associated with multiple content publishing users, who are different from the third-party system 130, to users. By interacting with content provided by the third-party system 130, users may purchase or otherwise acquire products associated with one or more content publishing users.

In the example shown by FIG. 4, the third-party system 130 transmits information 450 describing products offered by the third-party system 130 to the online system 140. The transmitted information 450 includes product identifiers for each product offered by the third-party system 130 paired with an identifier of a content publishing user associated with each product identifier. For example, an identifier of a content publishing user associated with a product identifier receives a manufacturer or a supplier of a product corresponding to the product identifier. The information 450 transmitted to the online system 140 includes other information about products offered by the third-party system 130, such as prices for different products specified by the third-party system 130, descriptions of different products offered by the third-party system 130, or any other suitable information.

A content publishing user 400 different than the third-party system 130 requests products associated with the content publishing user 400 and offered by the third-party system 130 from the online system 140. The request includes the identifier of the content publishing user 400 and an identifier of the third-party system 130. Using the identifier of the content publishing user 400, the online system 140 selects product identifiers associated with the identifier of the content publishing user 400 from the information 405 describing the products offered by the third-party system 130 and transmits information identifying the selected products 410 associated with the content publishing user 400 and offered by the third-party system 130 to the content publishing user 400 without transmitting information identifying products offered by the third-party system 130 and associated with other content publishing users. While FIG. 4 shows an example where the online system 140 requests products offered by the third-party system 130 and associated with the content publishing user 400 from the online system 140, in other embodiments, the content publishing user 400 transmits a request including the identifier of the content publishing user 400 to the third-party system 130, which selects products associated with the identifier of the content publishing user 300 and transmits information identifying the selected products 410 to the content publishing user without transmitting information identifying products offered by the third-party system 130 and associated with other content publishing users.

Subsequently, the content publishing user 400 transmits a content item 415 including a link to the third-party system 130 and information about at least one product 405 associated with the content publishing user 400 and offered by the third-party system 130. In some embodiments, the content item 415 includes a bid amount specifying an amount of compensation the content publishing user 400 provides the online system 140 in exchange for presenting the content item 415 to one or more users or in exchange for users performing one or more interactions after being presented with the content item 415, as further described above in conjunction with FIG. 2. Additionally, the content item 415 may include one or more targeting criteria specifying characteristics of users eligible to be presented with the content item 415. Hence, the content publishing user 400 leverages information describing products 410 associated with content publishing user 400 and associated with the third-party system 130 to generate a content item 415 to encourage a user to access the third-party system 130 and purchase one or more products associated with the content publishing user 400.

When the online system 140 identifies opportunities to present content to various viewing users, the online system 140 includes the content item 415 in one or more selection processes selecting content for presentation via different opportunities. If a selection process selects the content item 415 for presentation to a viewing user via an identified opportunity, the online system 140 transmits the content item 415 to a client device 110 for presentation to the viewing user via the identified opportunity. If the viewing user selects (e.g., clicks on, taps on) the link included in the content item 415 when the client device 110 presents the content item 415, the client device 110 requests 420 content identified by the link from the third-party system 130. Hence, interaction by the viewing user with the content item 415 allows the viewing user to obtain content from the third-party system 130, rather than from the content publishing user 400 who provided the online system 140 with the content item 415.

After receiving the request 420 for content corresponding to the link in the content item 415, the third-party system 130 transmits content 425 identified by the link in the content item 415 to the client device 110, which presents the content 425 to the viewing user. As further described above in conjunction with FIG. 3, content 425 from the third-party system 130 includes a tracking mechanism comprising instructions that, when executed by the client device 110 presenting the content 425, obtain information identifying one or more products included in the content and information identifying the viewing user to the online system 140. When the client device 110 executes the instructions comprising the tracking mechanism, the client device 110 transmits the information 430 obtained by the tracking mechanism identifying the one or more products included in the content 425 and identifying the viewing user to the online system 140. In various embodiments, the tracking mechanism obtains information 430 describing interaction with the content by the viewing user of the online system 140. For example, executing the tracking mechanism causes the client device 110 to transmit product identifiers of products included in the content including the tracking mechanism, prices of each product included in the content including the tracking mechanism, and a total cost of products included in the content including the tracking mechanism. The online system 140 may determine a cumulative price of products associated with the content publishing user 400 included in the content including the tracking mechanism to the online system 140 based on prices and quantities of products associated with the content publishing user 400 included in information from the tracking mechanism. For example, the content 425 from the third-party system 130 is a conformation page that is presented to the viewing user after the viewing user selects products offered by the third-party system 130 for purchase, and information 430 obtained by the tracking mechanism identifies products included in the order confirmation page, prices of the products included in the order confirmation page, and a total order amount included in the order confirmation page.

As further described above in conjunction with FIG. 3, the online system 140 subsequently modifies one or more selection processes using the information 430 from the tracking mechanism to subsequently increase likelihoods of presenting content items from the content publishing user 400 to the viewing user, or to other users. For example, the online system 140 modifies one or more selection processes based on a total amount of products identified by the tracking mechanism and associated with the content publishing user 300 to increase a likelihood of subsequent presentation of content items associated with the content publishing user. Additionally, the online system 140 subsequently requests compensation from the content publishing user 400 in response to information from the tracking mechanism identifying one or more products associated with the content publishing user 400. For example, the online system 140 transmits a request for compensation to the content publishing user 400 in response to the information 430 received from the tracking mechanism including a product identifier of a selected product identified by the content item 415 or in response to the information 430 received from the tracking mechanism including a product identifier of at least one product associated with the content publishing user 400.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining, at an online system, information from a third-party system describing characteristics of one or more products provided by the third-party system, each product provided by the third-party system associated with a product identifier and an identifier of a content publishing user corresponding to a product provided by the third-party system and not associated with the third-party system;
receiving a request from a specific content publishing user at the online system, the request including an identifier of the specific content publishing user;
selecting products provided by the third-party system associated with the identifier of the specific content publishing user from the information obtained from the third-party system;
transmitting information identifying the selected products from the online system to the specific content publishing user;
receiving a content item from the specific publishing user including a selected product, a product identifier of the selected product, and a link to content presented by the third-party system;
presenting the content item to a viewing user of the online system;
receiving, at the online system, the product identifier of the selected product, information identifying the viewing user to the online system, a price of the selected product by the third-party system, prices of products associated with the identifier of the specific content publishing user purchased by the viewing user via the third party system, and quantities of products associated with the identifier of the specific content publishing user purchased by the viewing user from a tracking mechanism included in content presented by the third-party system;

determining a cumulative price of products associated with the identifier of the specific content publishing user purchased by the viewing user from the third party system from the prices of products associated with the identifier of the specific content publishing user purchased by the viewing user via the third party system and the quantities of products associated with the identifier of the specific content publishing user purchased by the viewing user via the third-party system received from the tracking mechanism;

modifying one or more selection processes maintained by the online system to increase likelihoods of presentation of content items from the specific content publishing user to the viewing user based on the cumulative price of products associated with the identifier of the specific content publishing user purchased by the viewing user via the third-party system; and storing the modified one or more selection processes at the online system.

2. The method of claim 1, wherein receiving, at the online system, the product identifier of the selected product, the information identifying the viewing user to the online system, and the price of the selected product by the third-party system from the tracking mechanism included in content presented by the third-party system comprises:

receiving, at the online system, the product identifier of the selected product, the price of the selected product set by the third-party system, a cumulative price of products associated with the identifier of the specific content publishing user purchased by the viewing user via the third-party system, and a total amount of products purchased by the viewing user via the third-party system from the tracking mechanism included in content presented by the third-party system.

3. The method of claim 2, further comprising:

modifying one or more selection processes maintained by the online system to increase likelihoods of presentation of content items from the specific content publishing user to the viewing user based on the cumulative price of products associated with the identifier of the specific content publishing user purchased by the viewing user via the third-party system and the total amount of products purchased by the viewing user via the third-party system; and storing the modified one or more selection processes at the online system.

4. The method of claim 1, wherein the content item received from the specific content publishing user includes a bid amount specifying an amount of compensation the online system receives from the specific content publishing user.

5. The method of claim 4, further comprising:

transmitting a request for compensation from the online system to the specific content publishing user in response to the online system receiving the product identifier of the selected product from the tracking mechanism included in content presented by the third-party system.

6. The method of claim 4, further comprising:

transmitting a request for compensation from the online system to the specific content publishing user in response to the online system receiving a product identifier of a product associated with the specific content publishing user included in content presented by the third-party system.

7. The method of claim 1, wherein the content presented by the third-party system including the tracking mechanism comprises an order confirmation page.

8. The method of claim 1, wherein receiving the content item from the specific publishing user including the selected product, the product identifier of the selected product, and including the link to content presented by the third-party system comprises:

receiving a content item including the link to content presented by the third-party system, the identifier of the content publishing user, and an identifier of the third-party system;

retrieving products with which the viewing user previously interacted from information maintained by online system for the viewing user;

retrieving products provided by the third-party system associated with the identifier of the specific content publishing user from the information obtained from the third-party system and the identifier of the third-party system;

identifying one or more products provided by the third-party system associated with the identifier of the specific content publishing user having at least a threshold amount of characteristics matching characteristics of products with which the viewing user previously interacted; and including information describing the one or more identified products in the content item.

9. A computer program product comprising a nontransitory computer readable storage medium having instructions encoded thereon that, when executed by a processor, cause the processor to:

obtain, at an online system, information from a third-party system describing characteristics of one or more products provided by the third-party system, each product provided by the third-party system associated with a product identifier and an identifier of a content publishing user corresponding to a product provided by the third-party system and not associated with the third-party system;

receive a request from a specific content publishing user at the online system, the request including an identifier of the specific content publishing user;

select products provided by the third-party system associated with the identifier of the specific content publishing user from the information obtained from the third-party system;

transmit information identifying the selected products from the online system to the specific content publishing user;

receive a content item from the specific publishing user including a selected product, a product identifier of the selected product, and a link to content presented by the third-party system;

present the content item to a viewing user of the online system;

receive, at the online system, the product identifier of the selected product, information identifying the viewing user to the online system, a price of the selected product by the third-party system, prices of products associated with the identifier of the specific content publishing user purchased by the viewing user via the third party system, and quantities of products associated with the identifier of the specific content publishing user purchased by the viewing user from a tracking mechanism included in content presented by the third-party system;

determine a cumulative price of products associated with the identifier of the specific content publishing user purchased by the viewing user from the third party system from the prices of products associated with the identifier of the specific content publishing user purchased by the viewing user via the third party system and the quantities of products associated with the identifier of the specific content publishing user purchased by the viewing user via the third-party system received from the tracking mechanism;

modify one or more selection processes maintained by the online system to increase likelihoods of presentation of content items from the specific content publishing user to the viewing user based on the cumulative price of products associated with the identifier of the specific content publishing user purchased by the viewing user via the third-party system; and store the modified one or more selection processes at the online system.

10. The computer program product of claim 9, wherein receive, at the online system, the product identifier of the selected product, the information identifying the viewing user to the online system, and the price of the selected product by the third-party system from the tracking mechanism included in content presented by the third-party system comprises:

receive, at the online system, the product identifier of the selected product, the price of the selected product set by the third-party system, a cumulative price of products associated with the identifier of the specific content publishing user purchased by the viewing user via the third-party system, and a total amount of products purchased by the viewing user via the third-party system from the tracking mechanism included in content presented by the third-party system.

11. The computer program product of claim 10, wherein the nontransitory computer readable storage medium further has instructions encoded thereon that, when executed by the processor, cause the processor to:

modify one or more selection processes maintained by the online system to increase likelihoods of presentation of content items from the specific content publishing user to the viewing user based on the cumulative price of products associated with the identifier of the specific content publishing user purchased by the viewing user via the third-party system and the total amount of products purchased by the viewing user via the third-party system; and store the modified one or more selection processes at the online system.

12. The computer program product of claim 9, wherein the content item received from the specific content publishing user includes a bid amount specifying an amount of compensation the online system receives from the specific content publishing user.

13. The computer program product of claim 12, wherein the nontransitory computer program product further has instructions encoded thereon that, when executed by the processor, cause the processor to:

transmit a request for compensation from the online system to the specific content publishing user in response to the online system receiving the product identifier of the selected product from the tracking mechanism included in content presented by the third-party system.

14. The computer program product of claim 12, wherein the nontransitory computer program product further has instructions encoded thereon that, when executed by the processor, cause the processor to:

transmitting a request for compensation from the online system to the specific content publishing user in response to the online system receiving a product identifier of a product associated with the specific content publishing user included in content presented by the third-party system.

15. The computer program product of claim 9, wherein the content presented by the third-party system including the tracking mechanism comprises an order confirmation page.

16. The computer program product of claim 9, wherein receive the content item from the specific publishing user including the selected product, the product identifier of the selected product, and including the link to content presented by the third-party system comprises:

receive a content item including the link to content presented by the third-party system, the identifier of the content publishing user, and an identifier of the third-party system;

retrieve products with which the viewing user previously interacted from information maintained by online system for the viewing user;

retrieve products provided by the third-party system associated with the identifier of the specific content publishing user from the information obtained from the third-party system and the identifier of the third-party system;

identify one or more products provided by the third-party system associated with the identifier of the specific content publishing user having at least a threshold amount of characteristics matching characteristics of products with which the viewing user previously interacted; and include information describing the one or more identified products in the content item.

* * * * *

UNITED STATES PATENT AND TRADEMARK OFFICE
CERTIFICATE OF CORRECTION

PATENT NO. : 10,885,545 B1
APPLICATION NO. : 16/111159
DATED : January 5, 2021
INVENTOR(S) : Pablo Menendez Gonzalez et al.

Page 1 of 1

It is certified that error appears in the above-identified patent and that said Letters Patent is hereby corrected as shown below:

In the Claims

Column 28, Line 17, Claim 8, delete "from information maintained by online system" and insert -- from information maintained by the online system --.

Column 30, Line 38, Claim 16, delete "from information maintained by online system" and insert -- from information maintained by the online system --.

Signed and Sealed this
Sixth Day of July, 2021

Drew Hirshfeld
*Performing the Functions and Duties of the
Under Secretary of Commerce for Intellectual Property and
Director of the United States Patent and Trademark Office*